(No Model.) 2 Sheets—Sheet 1.

C. A. MADSEN.
CHURN.

No. 344,534. Patented June 29, 1886.

WITNESSES:
F. McArdle.
C. Sedgwick

INVENTOR:
C. A. Madsen
BY Munn & Co.
ATTORNEYS.

(No Model.) 2 Sheets—Sheet 2.

C. A. MADSEN.
CHURN.

No. 344,534. Patented June 29, 1886.

WITNESSES:
F. McArdle
C. Sedgwick

INVENTOR:
C. A. Madsen
BY Munn & Co.
ATTORNEYS.

UNITED STATES PATENT OFFICE.

CHRISTIAN A. MADSEN, OF GUNNISON, UTAH TERRITORY.

CHURN.

SPECIFICATION forming part of Letters Patent No. 344,534, dated June 29, 1886.

Application filed January 9, 1886. Serial No. 188,097. (No model.)

*To all whom it may concern:*

Be it known that I, CHRISTIAN A. MADSEN, of Gunnison, San Pete county, Territory of Utah, have invented a new and Improved Churn, of which the following is a full, clear, and exact description.

Reference is to be had to the accompanying drawings, forming part of this specification, in which similar letters of reference indicate corresponding parts in all the figures.

Figure 1:
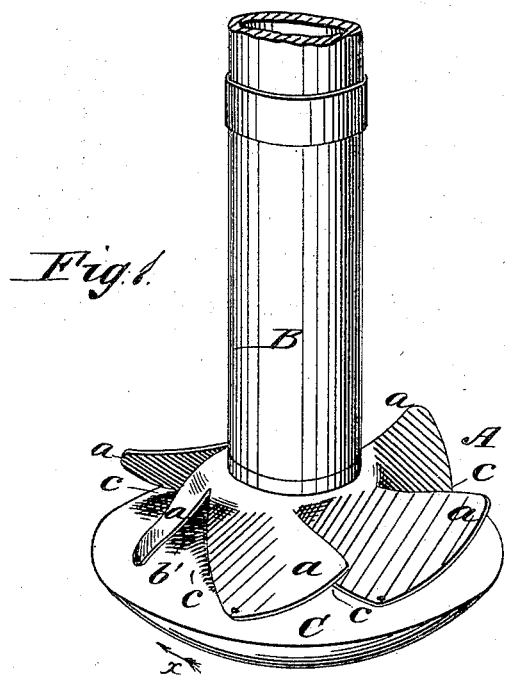
Figure 2:
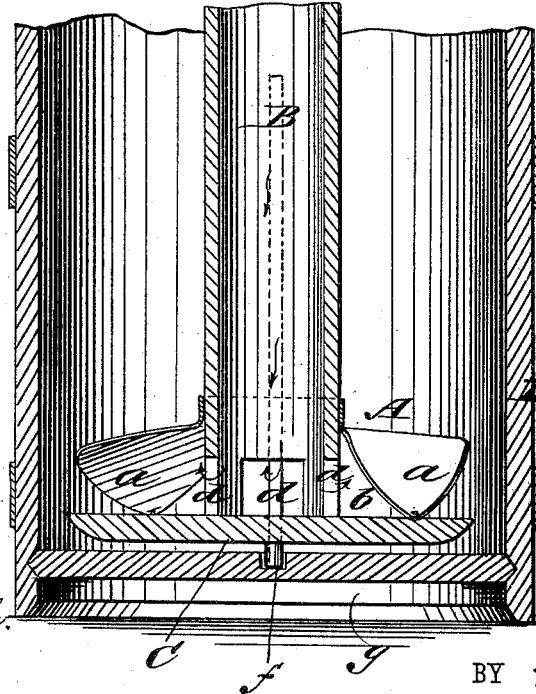
Figure 3:
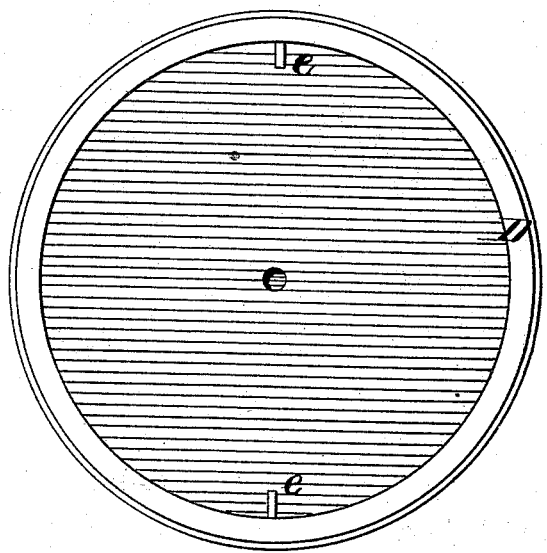

Figure 1 is a perspective view of the dasher of my improved churn. Fig. 2 is a vertical transverse section of the churn, and Fig. 3 is a plan view of the churn-body.

The object of my invention is to provide a churn with a rotary dasher capable of creating a rapid circulation of the cream or milk, at the same time mingling air with it to quicken the circulation and hasten the production of butter.

The invention consists of the combinations of parts, including their construction, substantially as hereinafter set forth, and pointed out in the claim.

The screw A, formed of sheet metal or other suitable material, is provided with blades $a$, having an inclination or pitch, as clearly shown in Fig. 1. The screw A is secured to a hollow shaft, B, and both the screw A and shaft B are attached to a disk, C, which is parallel with the plane of rotation of the screw. Between the screw A and disk C there is a chamber, $b$, with outlets $c$ between the blades $a$ of the screw. In the sides of the hollow shaft B, below the screw A, are openings $d$, through which communication is established between the interior of the hollow shaft and the chamber $b$ under the screw. A pivot, $f$, projects from the under surface of the disk C, in line with the axis of the hollow shaft B, and has a bearing in the center of the bottom $g$ of the churn-body D.

The upper end of the hollow shaft B is journaled in any convenient way, and rotary motion is imparted to the hollow shaft by well-known mechanical means.

When the churn-dasher, constructed according to my invention, is rotated in the direction indicated by the arrow $x$ in Fig. 1, or in a direction to cause it to propel the cream or milk upward, a partial vacuum is formed under the blades $a$ in the chamber $b$, into which air is drawn through the hollow shaft B, as indicated by the arrows in Fig. 2. The air thus drawn into the chamber $b$ escapes through the outlets $c$ and mingles with the cream and milk, rendering it lighter, so that it is more readily propelled upward by the screw. The air in its upward passage also assists in agitating the cream, and thus hastens the separation of the butter.

By making the blades $a$ strong enough to do the work of agitating the cream I may dispense with the disk C; therefore I do not confine myself to the use of the disk in connection with the screw.

To retard the rotation of the cream, I have applied vertical ribs $e$ to the interior of the walls of the churn-body, as shown in Fig. 3.

Having thus described my invention, I claim as new and desire to secure by Letters Patent—

In a churn, the combination, with the hollow shaft having at its lower end the disk, and immediately adjacent thereto and above it lateral apertures, of the screw having a series of inclined blades with their lower outer edges or corners connected to said disk, and the upper edge of one blade arranged a short distance or interval above or from the lower edge of the preceding blade, providing openings between the said edges of said blades and the outer or peripheral edges of the blades and the disk, substantially as shown and described.

CHRISTIAN A. MADSEN.

Witnesses:
CARL BERGLAND,
HELENA EINARSON.